UNITED STATES PATENT OFFICE.

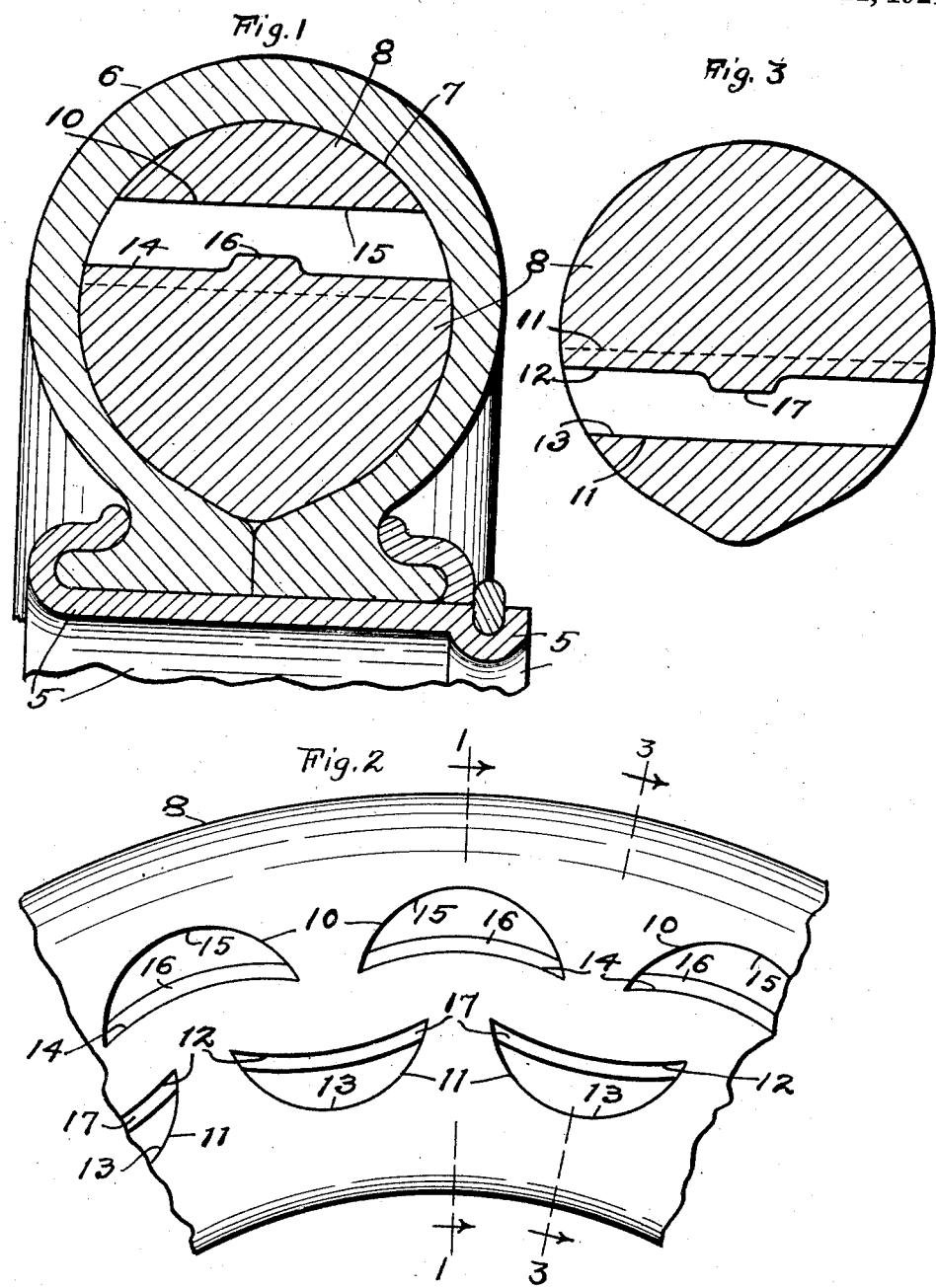

FREDERICK V. ROESEL, OF WELLINGTON, OHIO, ASSIGNOR OF ONE-HALF TO EBEN MILLER, OF PERRY, IOWA.

CORE FOR RESILIENT WHEEL-TIRES.

1,381,934.  Specification of Letters Patent.  Patented June 21, 1921.

Application filed November 6, 1919. Serial No. 336,062.

*To all whom it may concern:*

Be it known that I, FREDERICK V. ROESEL, a citizen of the United States, residing at Wellington, in the county of Lorain and State of Ohio, have invented a new and useful Core for Resilient Wheel-Tires, of which the following is a specification.

This invention relates to improvements in cores for resilient wheel-tires, and pertains more especially to that type of elastic and compressible non-inflatable tire-core in which holes extending transversely of the core are formed.

The primary object of this invention is to produce an elastic and compressible non-inflatable tire-core which is highly and uniformly resilient circumferentially of the core and has the requisite strength and durability from side to side and more especially centrally of the core.

With this object in view, and to attain any other object hereinafter appearing, this invention consists in such peculiarities, in the formation and construction of the core, as are hereinafter described in this specification, pointed out in the claims, and illustrated in the accompanying drawings.

In said drawings, Figure 1 is a cross-sectional view of a portion of a tire having a core embodying my invention, and shows the tire applied to the rim of a vehicle-wheel. Fig. 2 is a side view of a portion of said core. Fig. 3 is a transverse section taken along the line 3—3, Fig. 2. Fig. 1 shows the core in transverse section taken along the line 1—1, Fig. 2.

Referring to said drawings, 5, Fig. 1, indicates the rim of a vehicle wheel, and 6, the resilient casing of a tire applied to said rim. Said casing is substantially the same as the casing of an ordinary pneumatic tire and consequently composed of flexible and elastic material such, for instance, as rubber. Said casing extends circumferentially of the rim 5 and has an interior chamber 7 extending circumferentially of the rim. Within said chamber is contained my improved resilient non-inflatable core 8 extending circumferentially of and arranged concentrically relatively to the rim 5. Said core is separately illustrated in Figs. 2 and 3. Said core is composed of elastic and compressible material such, for instance, as rubber, and provided in its outer half with a row of holes 10 which extend from side to side and consequently transversely of the core and are spaced substantially equidistantly circumferentially of the inner half of the core. The core is provided in its inner half with a row of holes 11 which extend from side to side and consequently transversely of the core and alternate with the first-mentioned or outer holes 10. The outer holes 10 and the inner holes 11 substantially correspond in width,—that is, extend substantially equidistantly circumferentially of the core. The holes 10 and 11 are respectively reduced and enlarged in width in the direction of the outer circumference of the core. That is, each outer hole 10 is reduced in width in the direction of said circumference, and each inner hole 11 is enlarged in width in the direction of said circumference. Each inner hole has a radially inwardly facing and preferably somewhat inwardly curved wall 12 and an outwardly facing inwardly curved wall 13 opposite said inwardly facing wall. Each outer hole has a radially outwardly facing and somewhat outwardly curved wall 14 and an inwardly facing outwardly curved wall 15 which is in the form of a segmental arch having its span extending circumferentially of the inner row of holes 11. Hence the holes 10 and 11 are substantially crescent-shaped in end view and staggered, and the inner holes 11 are arranged reversely in relation to the outer holes 10, so that in the core hereinbefore described the arched main wall 15 of each outer hole 10 and the arched main wall 13 of each inner hole 11 face inwardly and outwardly respectively, and said core, without interference with the required strength and durability of the core, has greater resilience and is more uniformly resilient circumferentially than a core having staggered holes which are not crescent-shaped nor formed and relatively arranged as hereinbefore described and as illustrated in Fig. 2 of the drawings.

The outwardly facing wall 14 of each outer hole 10 has an outwardly projecting portion 16 arranged centrally between the sides of the core and extending from end to end of the span of the arch formed by the inwardly facing wall 15 of said hole. The inwardly facing wall 12 of each inner hole 11 has an inwardly projecting portion 17 arranged centrally between the sides of the core and extending transversely of said inner hole.

What I claim is—

An elastic and compressible non-inflatable tire-core which is provided in its outer half with holes spaced circumferentially of the inner half and extending from side to side of the core and also has holes formed in the last-mentioned half of the core, the last-mentioned or inner holes and the first-mentioned or outer holes being in staggered relation, each hole being substantially crescent-shaped in end view, each outer hole having its main wall in the form of a segmental arch and being arranged with said wall facing inwardly, and the inner holes being arranged reversely in relation to the outer holes.

In testimony whereof I sign the foregoing specification in the presence of two witnesses.

FREDERICK V. ROESEL.

Witnesses:
A. W. MASSEY,
H. I. MORNINGSTAR.